United States Patent [19]

Motomura et al.

[11] 4,380,801
[45] Apr. 19, 1983

[54] APPARATUS FOR MEASURING INJECTION SPEED IN INJECTION MOLDING MACHINES

[75] Inventors: Noriyuki Motomura; Hiroyuki Tsuboi, both of Zama, Japan

[73] Assignee: Toshiba Kikai Kabushiki Kaisha, Tokyo, Japan

[21] Appl. No.: 320,728

[22] Filed: Nov. 12, 1981

Related U.S. Application Data

[63] Continuation-in-part of Ser. No. 117,844, Feb. 4, 1980, abandoned.

[30] Foreign Application Priority Data

Feb. 7, 1979 [JP] Japan .................................. 54-14670

[51] Int. Cl.$^3$ .......................... G01P 3/48; G06F 15/46
[52] U.S. Cl. .................... 364/565; 264/40.7; 324/166; 364/476; 425/145; 377/16; 377/20
[58] Field of Search ................ 364/476, 565; 425/135, 425/145, 149; 264/40.7; 235/92 NP, 92 DN, 92 FQ; 324/166

[56] References Cited

U.S. PATENT DOCUMENTS

| 3,824,015 | 7/1974 | Petit et al. | 364/565 |
| 3,888,388 | 6/1975 | Mahoney | 425/145 |
| 3,899,664 | 8/1975 | Bencini et al. | 364/565 |
| 3,932,083 | 1/1976 | Boettner | 425/145 |
| 3,941,534 | 3/1976 | Hunkar | 425/145 |
| 4,159,293 | 6/1979 | Fukase et al. | 264/40.7 |

Primary Examiner—Errol A. Krass
Attorney, Agent, or Firm—Koda and Androlia

[57] ABSTRACT

In apparatus for measuring injection speed of an injection molding machine having a piston rod reciprocated by an injection cylinder of the injection molding machine, a plunger rod having, at an end thereof, a plunger tip slidably received in a plunger sleeve connected to a die, and a plunger coupling for interconnecting the plunger rod and the piston rod, the plunger coupling is provided with a projection. A proximity switch detects the projection while the plunger coupling moves. In accordance with the output of the proximity switch, the speed of the plunger coupling is computed.

2 Claims, 7 Drawing Figures

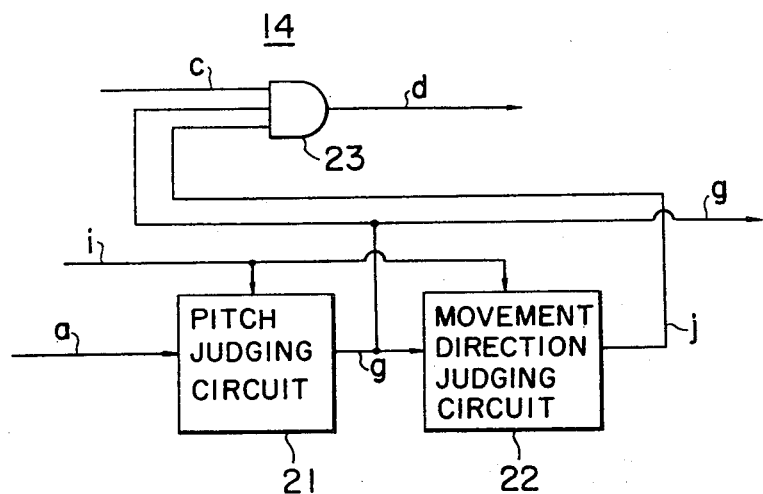
FIG. 2
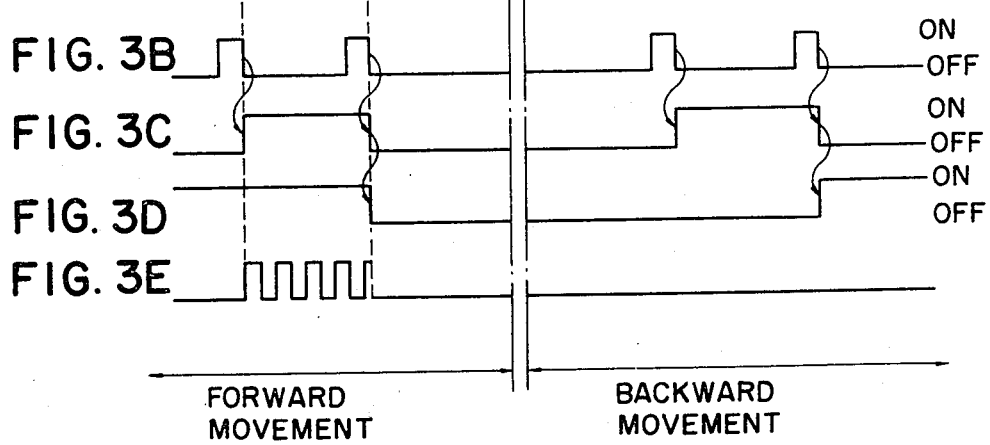

APPARATUS FOR MEASURING INJECTION SPEED IN INJECTION MOLDING MACHINES

CROSS REFERENCE TO A RELATED APPLICATION

This application is a continuation-in-part of a copending application Ser. No. 117,844, filed Feb. 4, 1980, now abandoned.

BACKGROUND OF THE INVENTION

The present invention relates to apparatus for measuring injection speed in an injection molding machine, such as a die casting machine or a plastic molding machine.

It has been known that, in an injection molding machine, variation in plunger injection velocity, injection pressure, die temperature or the like gives a considerable influences on the resultant products. However, apparatus for quickly and properly measuring these quantities have rarely been used. An example of a system for measuring plunger injection velocity is disclosed in Japanese patent application No. 2689/1973. In this system, a photo electric switch is associated with a light intercepting member fixed to a plunger, and period pulses are counted by a counter while a gate of a mold is open by the interception of light, and the plunger injection velocity is computed in accordance with the number of pulses received and counted by the counter.

This system has the following disadvantages.

(1) The photosensitive element or the light source are subject to contamination with plunger lubricant, mist of the mold releasing agent, and backflow (leakage of the molten metal through a small gap formed between the plunger and a plunger sleeve caused by thermal expansion thereof) of the mold material such as aluminum, and when the light path is interrupted the operation of the photoelectric switch becomes erroneous.

(2) When the light intercepting member such as a flag is rotated, it may hit the photosensitive element or the light source to cause breakage thereof. Mounting the light intercepting member in a way in which the rotation is avoided necessitates overall modification of the machine.

SUMMARY OF THE INVENTION

An object of the present invention is to provide apparatus for measuring the injection speed of an injection molding machine, which is easy to mount and which is free from erroneous operation.

According to the present invention, there is provided an apparatus for measuring injection speed of an injection molding machine having:

a piston rod reciprocated by an injection cylinder of the injection molding machine, a plunger rod having, at an end thereof, a plunger tip slidably received in a plunger sleeve connected to a die, and a plunger coupling for interconnecting the plunger rod and the piston rod, characterized in that plunger coupling is provided with a projection, and the apparatus further comprises:

a magnetic proximity switch for detecting the projection while the plunger coupling moves along the axis of the plunger rod and producing an output in accordance with the result of the detection, and a device for computing, in accordance with the output of the magnetic proximity switch, the speed of the plunger coupling.

BRIEF DESCRIPTION OF THE DRAWINGS

In the accompanying drawings:

FIG. 2 is a block diagram showing an example of detailed construction of the gate circuit 14 shown in FIG. 1; and FIGS. 3A through 3E are time charts showing the signals at various parts of the measuring apparatus shown in FIG.1 and FIG. 2.

DETAILED DESCRIPTION OF THE EMBODIMENTS

Figure 1:
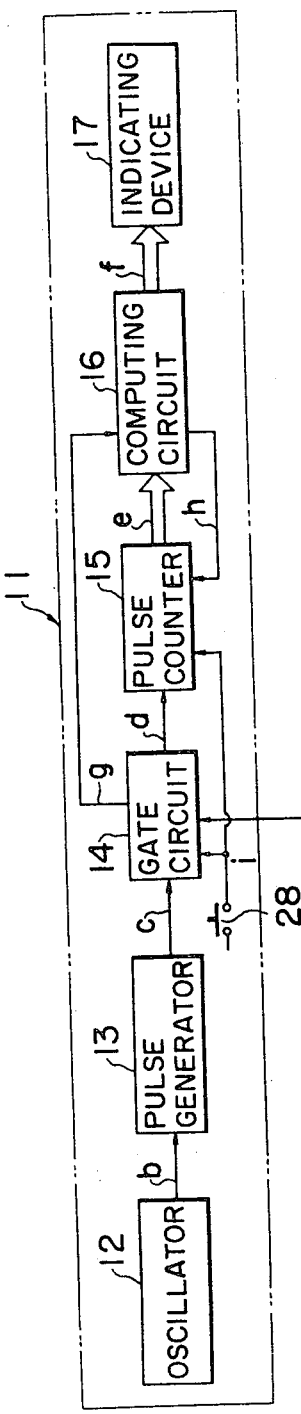
FIG. 1 is a schematic illustration of an injection molding machine with apparatus for measuring the injection velocity according to the present invention.
Figure 1:
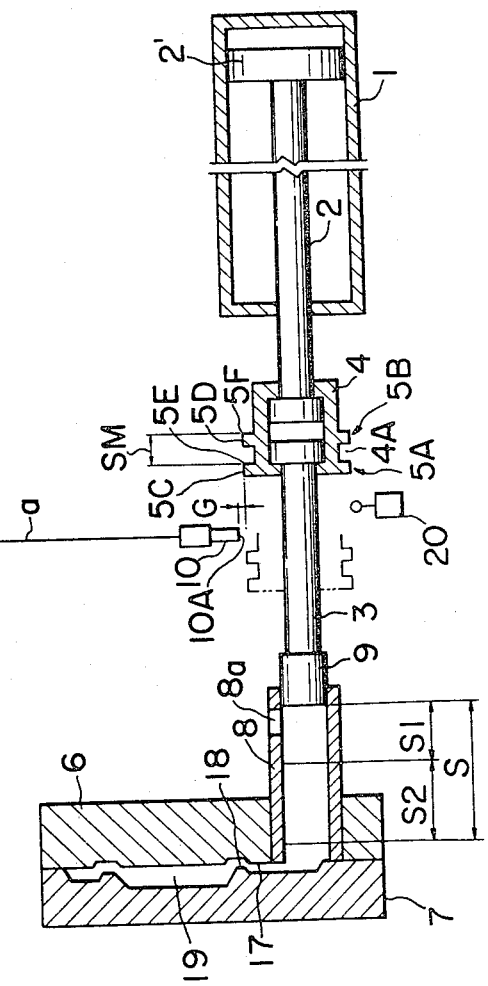

As illustrated in FIG. 1, a die casting machine, taken as an example of an injection molding machine, comprises an injection cylinder 1, a piston rod 2 connected to a piston 2' slidably received in the injection cylinder 1, a plunger rod 3 having, at the forward (left as viewed in FIG. 1) end, a plunger tip 9 slidably received in a plunger sleeve 8 connected to a stationary die 6, a plunger coupling 4 for interconnecting the plunger rod 3 and the piston rod 2, and a movable die 7 which is movable relative to the stationary die 6 and which, in cooperation with the stationary die 6, forms a mold cavity 19, a gate 18 and a runner 17 between itself and the stationary die 6, when it is in the closed position as illustrated.

A limit switch 20 is provided to be operated when the plunger coupling 4 passes the limit switch 20.

Molten metal, not shown, is poured through the pouring port 8a provided through the plunger sleeve 8. Then, piston rod 2, the plunger coupling 4 and the plunger rod 3 with the plunger tip 9 is moved forward (leftward as viewed in FIG. 1) by the operation piston 2'. The molten metal is pushed by the plunger tip 9 through the runner 17 and the gate 18 into the mold cavity 19. Until the molten metal reaches the gate 18, i.e., during a first stroke $S_1$ of the plunger tip 9, the movable members 2, 3, 4 and 5 move at a low speed, 0.5 m/sec. for example, The low speed movement is terminated by the operation of the limit switch 20. After that, i.e., during a second stroke $S_2$, the speed of the movable members 2, 3, 4 and 9 is at a higher level, 3–5 m/sec. for example.

The plunger coupling 4 is provided with a pair of radially outwardly extending projections 5A and 5B between which a recess 4A is formed. In the illustrated embodiment, the plunger coupling 4 is cylindrical and the projections 5A and 5B have annular outer circumferential surfaces 5C and 5D substantially coaxial with the piston rod 2 and the plunger rod 3.

The distance SM between the rear edges 5E and 5F of the outer surfaces 5C and 5D is determined to be suitable for computation of the speed of the plunger coupling 4 performed in a manner described later, and is, for example, 20 mm.

A magnetic proximity switch 10 is mounted in a conventional manner and is positioned to confront the outer surfaces 5C and 5D while the plunger coupling 4 is moved by the injection cylinder 1, with a suitable gap G between the outer surfaces 5C and 5D, and the confronting surface 10A of the proximity switch 10. Preferably, the proximity switch 10 is adjustable along the axis of the piston rod 2, to enable choice between a first position in which the projections 5A and 5B successively confront the proximity switch 10 during the first stroke $S_1$ and a second position in which the projections 5A and 5B successively confront the proximity switch 10 during the second stroke $S_2$, and also to enable positioning of the proximity switch 10 to the exact point at which the speed of the plunger coupling is to be measured.

The proximity switch 10 may, for example, be of a magnetoresistance element type or of a Hall element type.

The proximity switch 10 is a zero-velocity magnetic proximity switch, i.e., of a type which produces a voltage of a constant level as long as the outer surface 5C or 5D is in confrontation with the proximity switch 10.

The output a of the proximity switch head 10 is fed to a computing and indicating device 11, which comprises an oscillator 12, a pulse generator 13 responsive to the output b of the oscillator 12 for producing pulses shown in FIG. 3A at a predetermined interval $T_M$, and a gate circuit 14 which receives the output c of the pulse generator 13 and the output a of the proximity switch 10, and permits passage of the pulses from the pulse generator 13 during the time interval when the rear edge 5E has passed the proximity switch 10 and the rear edge 5F has not passed the proximity switch head 10. The pulses d passed through the gate circuit 14 are fed to a pulse counter 15, which counts the pulses fed to it.

A digital speed computing circuit 16 receives the output e of the pulse counter 15, that indicates the number N of the pulses fed to the pulse counter 15, and, in accordance with the output of the pulse counter 15, as well as the interval $T_M$ and the distance $S_M$, performs the following operation to obtain the speed V of the plunger coupling 4.

$$V = S_M / T_M \times N$$

The computation is commenced responsive to a second output g of the gate circuit 14. When the computation is completed the computation circuit 16 produces a signal h for resetting the pulse counter 15. The pulse counter 15 is also reset by a reset push button switch 28.

A digital indicating device 17 indicates the speed V computed by the computing circuit 16.

As illustrated in FIG. 2A, the gate circuit 14 may comprise a pitch judging circuit 21 which receives the output a of the proximity switch 10 and comprises a T type (trigger type) flip-flop circuit, not shown, and changes the state of its own output, between low and high levels, as its input falls from high to low level. The output g of the pitch judging circuit 21 is fed to a movement direction judging circuit 22, which also comprises a T type flip-flop circuit, not shown, and changes the state of its own output j, between low and high levels, as its input falls from high to low level. The pitch judging circuit 21 and the movement direction judging circuit 22 can be reset to the low level output state by a preset push button switch 28. An AND gate circuit 23 receives the output g of the pitch judging circuit 21 and the output j of the movement direction judging circuit 22 as well as the pulses c from the pulse generating circuit 13, and the output d of the AND gate circuit 23, constituting the output of the gate circuit 13, is fed to the pulse counter 15.

The output g of the pitch judging circuit 21 is used for triggering the computing circuit 16. More specifically, when the output g of the pitch judging circuit 21 falls from high to low level, the computing circuit 16 commences the computation of the speed.

When the movable members 2, 3, 4 and 9 commence forward movement, the pitch judging circuit 21 and the movement direction judging circuit 22 have already been reset to the low level output stage by manual operation of the push button switch 28 or by automatic operation during the previous cycle. When the projections 5A and 5B pass the proximity switch 10, the proximity switch 10 produces signals as shown in FIG. 3B, and the outputs of the judging circuits 21 and 22 vary as shown in FIGS. 3C and 3D, respectively. Thus, during the forward movement, the pulses (FIG. 3A) from the pulse generating circuit 13 are passed during the time interval between the passages of the rear edges 5E and 5F past the proximity switch 10, so that the output of the gate circuit 14 becomes as shown in FIG. 3E.

After the rear edge 5F passes the proximity switch 10, the computing circuit 16 computes the speed, and the indicating device 17 indicates the computed speed.

During the rearward movement, the output of the movement direction judging circuit 22 becomes a low level, so that the pulses are not passed through the AND gate circuit 23.

The axial portion of the proximity switch 10 may be adjusted along the axis of the piston rod depending on the position at which the speed of the plunger coupling is desired to be measured.

It will be appreciated that the only external electrical connection of the computing and indicating device 11, apart from the possible connection to the electric power source, not shown, is the connection to the proximity switch, so that installation and maintenance of the measuring apparatus are simple.

In the embodiment described above, the pulses from a pulse generator are passed during the time interval between the passages of the rear edges of the projections past the proximity switch. But the gate circuit 14 may alternatively formed to pass the pulses during the time interval between passages of leading edges of the projections past the proximity switch.

In place of the two projections, a single projection may be provided whose width being substantially equal to the distance $S_M$. In this case, the pitch judging circuit 21 is not necessary, but the output of the proximity switch is used in substitution for the output of the pitch judging circuit 21.

In the embodiment described above, the oscillator 12 and the pulse generator 13 keep on producing their outputs, however, the system may be so arranged that the pulse generator 13 produces pulses only when the conditions for opening the gate circuit 14 is satisfied.

Where the measuring apparatus is used in conjunction with an injection molding machine for molding nonmagnetic material, the measuring apparatus has an advantage in that it is not adversely affected by backflow of the material. Such backflow is easy to occur when the material to be molded is aluminum.

What is claimed is:

1. An apparatus for measuring an injection speed in an injection molding machine having:
    a piston rod reciprocated by an injection cylinder of the injection molding machine,
    a plunger rod having, at one end thereof, a plunger tip slidably received in a plunger sleeve connected to a die, and a plunger coupling for interconnecting the plunger rod and the piston rod, the improvement in which the plunger coupling is provided with two projections with a recess formed therebetween, and which comprises:

a magnetic proximity switch for detecting said projection while the plunger coupling moves along the axis of the plunger rod and producing an output in accordance with the result of the detection, and a means for computing in accordance with the output of said magnetic proximity switch, the speed of the plunger coupling, said computing means comprising means for producing pulses at a predetermined interval ($T_M$), a gate circuit responsive to the output of said proximity switch for passing said pulses during the time interval after an edge of a first projection has passed said proximity switch and before a corresponding edge of a second projection passes said proximity switch, a pulse counter responsive to said output of said gate circuit for counting the number of pulses from said gate circuit, and a computing circuit responsive to the output of said pulse counter for computing the speed (V), in accordance with the number (N) of pulses counted by said pulse counter, the interval ($T_M$), and the distance ($S_M$) between said edge of said first projection and said edges of said second projection.

2. Apparatus according to claim 1, wherein said gate circuit comprises a pitch judging circuit including a flip-flop circuit responsive to the output of said proximity switch for changing its own output between two states, to indicate whether or not said edge of said first projection has passed said proximity switch and said edge of said second projection has not passed said proximity switch, and a movement direction judging circuit including a flip-flop circuit responsive to the output of said pitch judging circuit for changing its own output between two states to indicate whether or not said piston rod is in forward movement.

* * * * *